United States Patent
Ban et al.

(10) Patent No.: US 9,713,802 B2
(45) Date of Patent: Jul. 25, 2017

(54) METHOD AND APPARATUS FOR MANUFACTURING LIQUID MICROSPHERES

(75) Inventors: Hiroyuki Ban, Takasago (JP); Koji Noishiki, Takasago (JP); Kazuto Okada, Kobe (JP); Seiichi Yamamoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 1436 days.

(21) Appl. No.: 12/473,906

(22) Filed: May 28, 2009

(65) Prior Publication Data

US 2010/0179230 A1 Jul. 15, 2010

Related U.S. Application Data

(60) Provisional application No. 61/144,259, filed on Jan. 13, 2009.

(51) Int. Cl.
*B01J 19/26* (2006.01)
*B01F 3/08* (2006.01)
*B01J 19/00* (2006.01)

(52) U.S. Cl.
CPC .. *B01J 19/0093* (2013.01); *B01J 2219/00783* (2013.01); *B01J 2219/00837* (2013.01);
(Continued)

(58) Field of Classification Search
CPC ............... B01F 13/071; B01F 13/0071; B01J 2219/00873; B01J 2219/00783;
(Continued)

(56) References Cited

U.S. PATENT DOCUMENTS 4,259,291 A * 3/1981 Smythe .......................... 422/82
6,130,098 A * 10/2000 Handique et al. ............ 436/180
(Continued)

FOREIGN PATENT DOCUMENTS

JP 2005-144356 6/2005
JP 2005-199238 7/2005
(Continued)

OTHER PUBLICATIONS

Derwent Abstract, week 201051, London: Derwent Publications Ltd., AN 2010-J40580, WO 2010082432 A1, (Kobe Seiko Sho KK), abstract.*

(Continued)

*Primary Examiner* — Daniel S Metzmaier
(74) *Attorney, Agent, or Firm* — Oblon, McClelland, Maier & Neustadt, L.L.P.

(57) ABSTRACT

The present invention provides microsphere manufacturing method and apparatus capable of stable obtaining microspheres of a desired size and reducing facility cost. According to the method and the apparatus, to manufacture microspheres made of a second liquid in a first liquid, the first liquid is supplied into a first channel to flow therein and the second liquid is supplied to an intermediate part of the first channel through a second channel. The supply velocities of the first and second liquids are set such that the second liquid closes the first channel and the closing part of the second liquid is cut off due to a pressure difference between an upstream side and a downstream side to form microspheres.

3 Claims, 6 Drawing Sheets

(52) U.S. Cl.
CPC ............... *B01J 2219/00873* (2013.01); *B01J 2219/00889* (2013.01); *B01J 2219/00891* (2013.01); *B01J 2219/00984* (2013.01)

(58) Field of Classification Search
CPC .... B01J 2219/00889; B01J 2219/00984; B01J 2219/00837; B01J 2219/00891
USPC ............... 422/131, 603, 129, 130; 264/459; 516/21
See application file for complete search history.

(56) References Cited

U.S. PATENT DOCUMENTS

| | | | |
|---|---|---|---|
| 6,481,453 B1* | 11/2002 | O'Connor et al. | 137/15.04 |
| 6,572,830 B1* | 6/2003 | Burdon et al. | 422/186.29 |
| 7,268,167 B2 | 9/2007 | Higuchi et al. | |
| 8,772,046 B2* | 7/2014 | Fraden et al. | 436/180 |
| 2005/0087122 A1* | 4/2005 | Ismagliov et al. | 117/2 |
| 2005/0272159 A1* | 12/2005 | Ismagilov et al. | 436/34 |
| 2006/0003439 A1* | 1/2006 | Ismagilov et al. | 435/287.2 |
| 2006/0079584 A1* | 4/2006 | Higuchi et al. | 516/73 |
| 2006/0094119 A1* | 5/2006 | Ismagilov | B01F 13/0071 |
| | | | 436/55 |
| 2006/0220269 A1 | 10/2006 | Noritomi et al. | |
| 2008/0032390 A1* | 2/2008 | Meyvantsson | B01L 3/502753 |
| | | | 435/286.5 |
| 2009/0272492 A1* | 11/2009 | Katz et al. | 156/345.34 |
| 2010/0179230 A1* | 7/2010 | Ban et al. | 516/21 |

FOREIGN PATENT DOCUMENTS

| | | |
|---|---|---|
| JP | 2006-21156 | 1/2006 |
| JP | 2006-504512 | 2/2006 |
| JP | 2006-272196 | 10/2006 |
| JP | 2006-341154 | 12/2006 |
| WO | WO 2004/038363 A2 | 5/2004 |
| WO | WO 2004/038363 A3 | 5/2004 |

OTHER PUBLICATIONS

Hau et al., "Surface-chemistry technology for microfluidic," Journal of Micromechanics and Microengineering, 13 (2003) 272-278.*
WIPO abstract for WO02068104 A1 (Sep. 6, 2002), obtained @ http://worldwide.espacenet.com/.

* cited by examiner

METHOD AND APPARATUS FOR MANUFACTURING LIQUID MICROSPHERES

BACKGROUND OF THE INVENTION

Field of the Invention

The present invention relates to technology for manufacturing liquid microspheres in the fields of chemical industry, pharmaceutical, biochemistry and the like.

Description of the Background Art

There are conventionally known methods disclosed in International Publication WO 02/068104 A1 and Japanese Unexamined Patent Publication No. 2005-144356 as a method for manufacturing microspheres of another liquid (second liquid) in a specified liquid (first liquid). In the methods disclosed in these literatures, used is a microchannel, in which a continuous phase (first liquid) is flowed, and a dispersed phase (second liquid) is supplied to the flowing continuous phase in a direction intersecting with the flow of the continuous phase. The dispersed phase having entered the flow of this continuous phase is successively cut off by a shear force produced by the flow of the continuous phase, thereby forming microspheres considerably smaller than the channel cross section of the microchannel.

However, these methods have the following problems to be solved.

1) It is difficult to control the diameters of microspheres. The diameters thereof obtained by the above methods are likely to vary depending on various conditions, which disturbs stably manufacturing microspheres having a desired diameter. On this point, the above International Publication WO 02/068104 discloses that changing liquid feeding pressures of the dispersed phase and continuous phase enables the diameters of the microspheres to be controlled, but the pressure adjustments themselves are not easy. Conversely, the pressure variation during the operation causes an inconvenience of variation in the diameters of microspheres. On the other hand, the above Japanese Unexamined Patent Publication No. 2005-144356 discloses a control of microsphere diameters by changing an intersection angle of a dispersed phase introducing channel and a continuous phase introducing channel, but the particle diameters largely vary similar to the invention disclosed in the above International Publication WO 02/068104.

2) The facility cost of an apparatus is high. The above methods, which include cutting off the dispersed phase in the channel by the flowing force of the continuous phase in the channel, require a considerably large flow rate (flow rate of the continuous phase) to obtain a necessary shear force, and ensuring such a flow rate requires a relatively large liquid feeding facility (e.g. pump) and a driving power for it.

SUMMARY OF THE INVENTION

An object of the present invention is to provide a method and an apparatus for manufacturing liquid microspheres, which method and apparatus can stably manufacture microspheres made of a second liquid and having a desired size in a first liquid and can reduce facility cost.

In order to accomplish this object, the present invention is directed to a method for manufacturing microspheres, comprising a step of supplying a first liquid into a first channel to flow it in the first channel; and a second step of supplying a second liquid different from the first liquid to an intermediate part of the first channel through a second channel connected with the first channel. The supply velocities of the first and second liquids into the first channel are set such that the second liquid supplied into the first channel closes the first channel and a part of the second liquid having closed the first channel is cut off from the other part of the second liquid in the second channel by a pressure difference in the first channel between an upstream side and a downstream side and moves to the downstream side of the first channel to form microspheres.

The present invention is also directed to a channel forming body suitably used for the microsphere manufacturing method, wherein the channel forming body forms channels including a first channel into which the first liquid is supplied and a second channel joined to an intermediate part of the first channel, and has a special inner wall surface in a specific region of the first channel including a junction point of the first and second channels, the special inner wall surface having an affinity with the second liquid higher than that of the other inner wall surface out of the specific region.

Furthermore, the present invention is directed to an apparatus for manufacturing microspheres, comprising a channel forming body forming channels including a first channel into which a first liquid is supplied and a second channel joined to an intermediate part of the first channel; first liquid supply means for supplying the first liquid into the first channel to flow it along the first channel; and second liquid supply means for supplying a second liquid into the second channel to supply it to the intermediate part of the first channel through the second channel. The supply velocity of the first liquid by the first liquid supply means and that of the second liquid by the second liquid supply means are set such that the second liquid supplied into the first channel closes the first channel and a part of the second liquid having closed the first channel is cut off from the other part of the second liquid in the second channel due to a pressure difference between its upstream side and its downstream side to form microspheres.

DETAILED DESCRIPTION OF THE PREFERRED EMBODIMENTS OF THE INVENTION

Hereinafter, preferred embodiments of the present invention are described with reference to the accompanying drawings. It should be noted that elements such as constructions and arrangements disclosed in these embodiments do not limit the scope of the present invention, but are merely examples.

A first embodiment of the present invention is described with reference to FIGS. 1 to 4.

Figure 1:
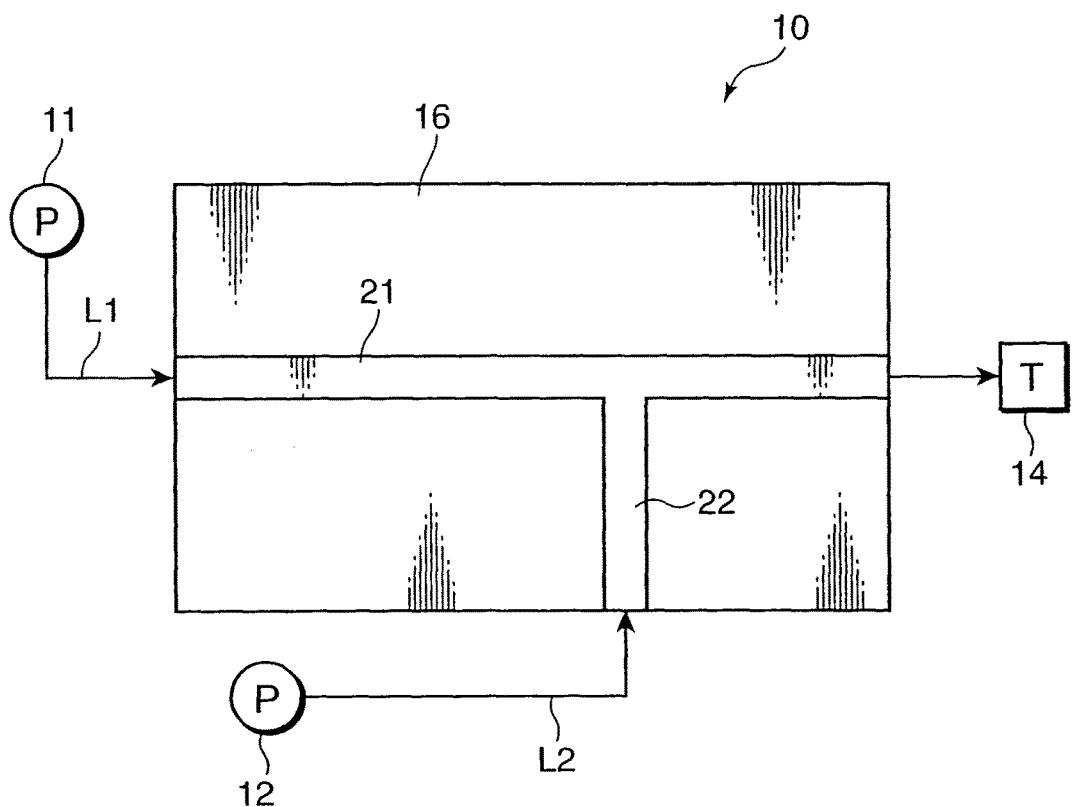
FIG. 1 is a diagram showing a microsphere manufacturing apparatus according to a first embodiment of the invention.

FIG. 1 shows a microsphere manufacturing apparatus according to this embodiment. This apparatus comprises a channel forming body 10 for forming microchannels, a first liquid supply pump 11, a second liquid supply pump 12 and a tank 14. The first liquid supply pump 11 supplies a first liquid L1 to the channel forming body 10 and the second liquid supply pump 12 supplies a second liquid L2 to the channel forming body 10. The tank 14 is for storing a liquid discharged from the channel forming body 10 (mixture of microspheres of the second liquid L2 in the first liquid L1 as described later).

Figure 2:
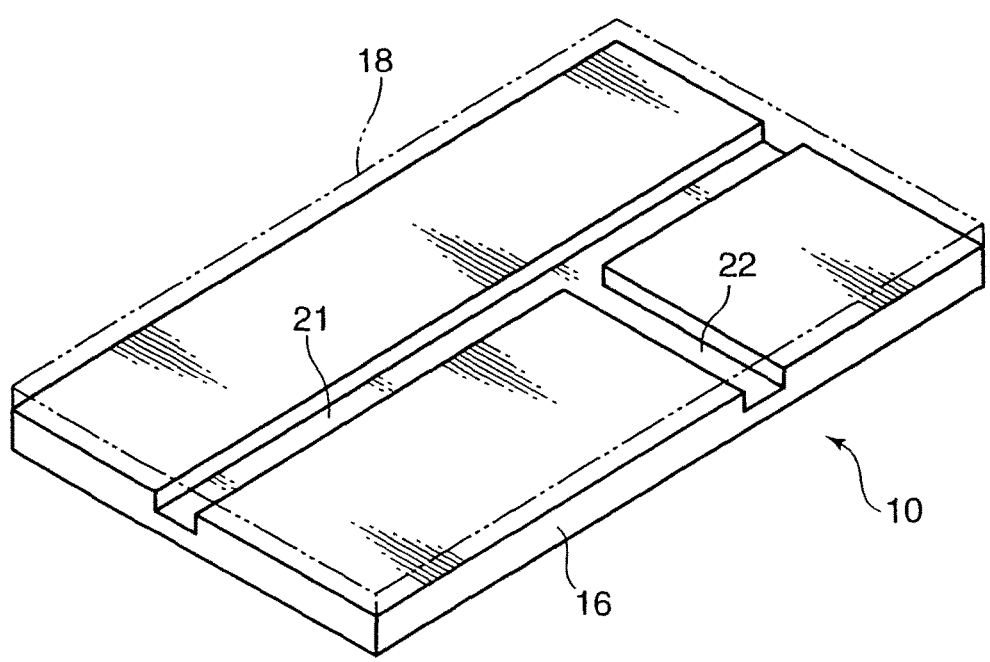
FIG. 2 is a perspective view showing a channel forming body used in the manufacturing apparatus.

The channel forming body 10, for forming a first channel and a second channel, comprises a base plate 16 and a cover plate 18 as shown in FIG. 2. The base plate 16 and the cover plate 18 are in the form of flat plates having the same outer shape (rectangular shape in a shown example), and bonded to each other in a lamination in a thickness direction. The both plates 16 and 18 are not particularly limited to their materials, which are suitably selected according to the kinds of the both liquids L1 and L2. Generally, preferable are materials having a high shape retaining property: for example, metal materials such as stainless steel and titanium, inorganic materials such as glass and ceramics and organic materials such as hard plastics can be suitably selected.

The upper surface of the base plate 16A is formed with a first groove 21 and a second groove 22. The first groove 21 is a straight one crossing the base plate 16 in a longitudinal direction thereof. The second groove 22 is joined to the first groove 21 so as to end in the first groove 21 and intersect with it at right angles, i.e., so as to form a T-shape. One end of the second groove 22 is connected with an intermediate part of the first groove 21 and the other end thereof reaches a longer side of the base plate 16.

The cover plate 18 is closely attached (e.g. bonded) to the upper surface of the base plate 16 so as to cover the both grooves 21 and 22 from above. The lower surface of the cover plate 18 encloses the small first channel in conjunction with the inner wall surface of the first groove 21 while enclosing the small second channel in conjunction with the inner wall surface of the second groove 22.

The grooves 21, 22 are satisfactorily formed by etching, for example. The grooves 21, 22 can be formed also by machine working, laser processing, electropolishing or the like.

The first liquid supply pump 11 is connected to one end of the first channel, i.e. one end of the first groove 21 (the left end in FIG. 1) via an unillustrated pipe. Similarly, the second liquid supply pump 12 is connected to an end of the second channel, i.e. the other end of the second groove 21 (the end opposite to the one connected with the first channel) via an unillustrated pipe. The tank T is connected to the other end of the first channel (the right end in FIG. 1) via an unillustrated pipe.

Next, a method for manufacturing microspheres (made of the second liquid L2) by use of the apparatus is described also with reference to FIG. 3.

Figure 3A:
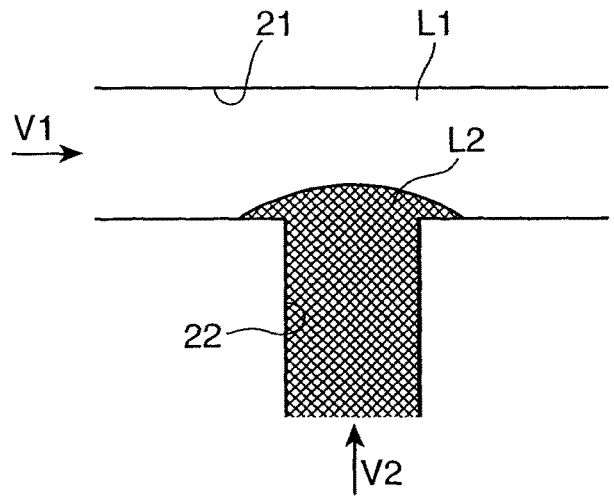
FIGS. 3A, 3B and 3C are enlarged plan views showing the process of manufacturing microspheres in the manufacturing apparatus.

First of all, the first liquid supply pump 11 supplies the first liquid L1 at a velocity V1 (FIG. 3A) into the first channel enclosed by the first groove 21 and the cover plate 18. The first liquid L1 flows in the first channel longitudinally thereof. On the other hand, the second liquid supply pump 12 supplies the second liquid L2 at a velocity V2 (FIG. 3A) into the intermediate part of the first channel via the second channel enclosed by the second groove 22 and the cover plate 18. The second liquid L2 gradually enters the first channel as shown in FIG. 3A.

Figure 3B:
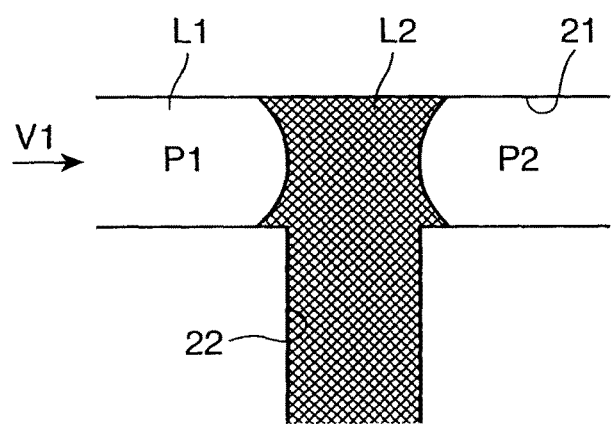

At this time, differently from the conventional methods disclosed in Internal Publication WO 02/068104 A1 and Japanese Unexamined Patent Publication No. 2005-144356 disclosed above, the respective supply velocities V1 and V2 of the both liquids L1 and L2 are set such that the second liquid L2 remains at a junction point of the both channels until completely closing the first channel as shown in FIG. 3B. Specifically, a ratio of the supply velocity V1 of the first liquid L1 to that V2 of the second liquid L2 is set to be low. In other words, a supply pressure of the first liquid L1, in the conventional methods, is set to be high so that the second liquid L2 having entered the first channel is cut off relatively quickly by the first liquid L1, whereas an operational condition, in the method according to this embodiment, is so set as to keep the supply velocity (flow velocity V1) of the first liquid L1 by the first liquid supply pump 11 below.

Figure 3C:
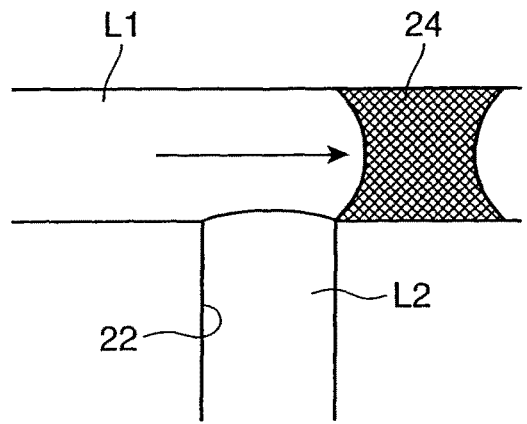

The second liquid L2, closing the first channel, drastically increases a difference between a pressure P1 at an upstream side of the first channel and a pressure P2 at a downstream side thereof(=P1−P2). This pressure difference reaches a specified level or higher, thereby cutting off a part of the second liquid L2 in the first channel from the other part of the second liquid L2 in the second channel. The cut-off part of the second liquid L2 moves to the downstream side, flowing as a microsphere 24 as shown in FIG. 3C. This microsphere 24 made of the second liquid L2 is discharged into the tank T together with the first liquid L1. Repeating the above operation results in volume production of the microspheres 24 made of the second liquid L2 in the first liquid L1.

In this method, the second liquid L2 is cut off after completely closing the first channel, thus make the size of the microspheres 24 formed by the cut-off operation invariably correspond to the channel cross-sectional area of the first channel. This contributes to stable sizes of the microspheres 24 and further reduction of the facility cost. In the conventional methods, shearing is applied to the second liquid L2 by a flowing force of the first liquid L1 at a relatively early stage after the entrance of the second liquid L2 into the first channel, thus making the sizes of microspheres obtained by the shearing unstable and requiring relatively large liquid supplying facility and a driving power for it to shear the second liquid L2. In contrast, the method according to this embodiment not only allows the sizes of the microspheres 24 stable, but also permits the construction of the first liquid supply pump 11 and the power for it to be small by setting the operational condition so as to keep the flow velocity V1 of the first liquid L1 below.

Figure 4:
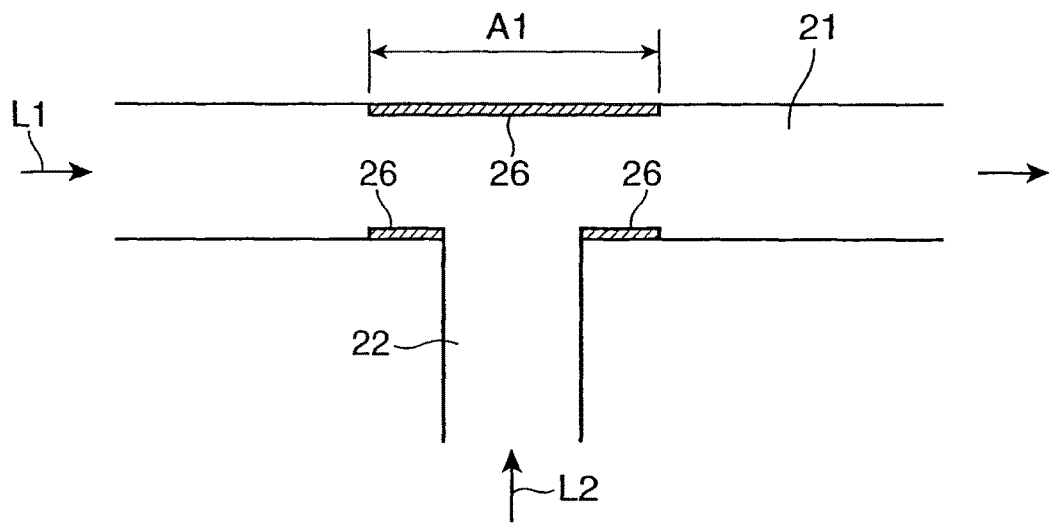
FIG. 4 is an enlarged plan view showing an essential part of a channel forming body according to a second embodiment of the invention.

The action that the second liquid L2 closes the first channel will be more reliable in a structure as shown in FIG. 4 as a second embodiment. In this structure, the first channel enclosed by the first groove 21 and the cover plate 18 has a special inner wall surface 26 within a specific region A1 including the junction point with the second channel in the first channel, the special inner wall surface 26 having an affinity with the second liquid L2 higher than that of the other inner wall surface out of the specific region A1. The higher affinity with the second liquid L2 promotes the second liquid L2 to stay near the junction point, thereby enabling the second liquid L2 to close the first channel to be cut off more reliably. Furthermore, the microsphere formed by the cut-off can smoothly flow in the first channel out of the specific region A1 to be discharged.

The high affinity can be given by, for example, the formation of fine convexo-concave pattern in the special inner wall surface 26 of the first channel in the specific region A1 or coating the inner surface with a material having high affinity with the second liquid L2.

The above microsphere manufacturing method can be further utilized for a chemical reaction between the first liquid L1 and the second liquid L2. Specifically, the chemical reaction can be made while the microspheres of the first liquid is flowed with the first liquid L1 in the first channel downstream (right side in FIG. 1) of the point at which the second liquid L2 is supplied into the first liquid L1. This operation for the chemical reaction is achieved by a channel length of the downstream part of the first channel part enough to permit the above chemical reaction. This channel length is determined based on time required for the chemical reaction and the flow velocity of the microspheres. In other word, the channel length can be set to control a degree of the chemical reaction.

The above microsphere manufacturing method allows a reaction velocity of the above chemical reaction to be stable. Specifically, the stable sizes of the microspheres manufactured by this method stabilizes the contact area of the second liquid L2 forming the microspheres and the first liquid L1 around the second liquid L2, thus stabilizing the reaction velocity.

Figure 5:
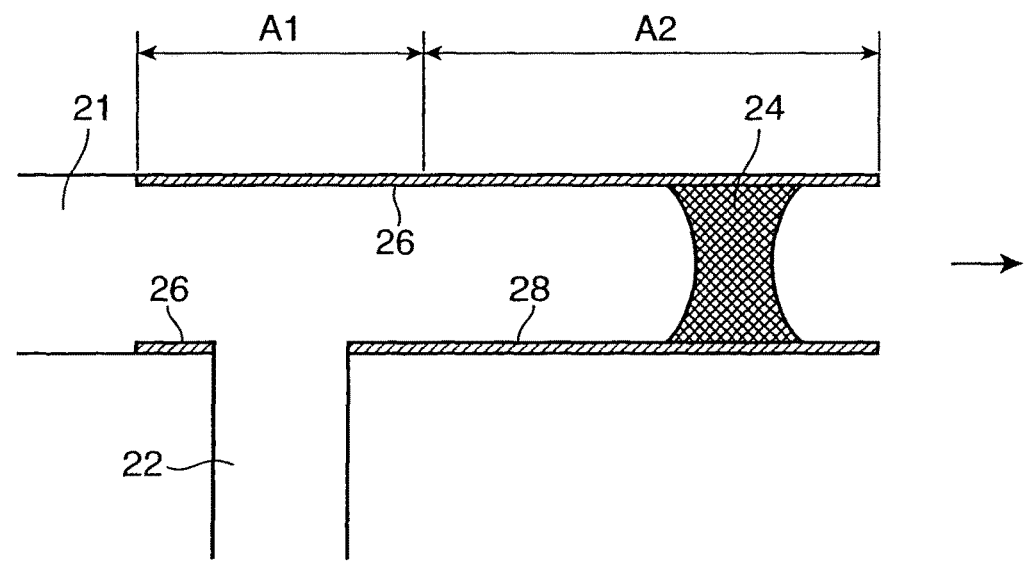
FIG. 5 is an enlarged plan view showing an essential part of a channel forming body according to a third embodiment of the invention.

In order to ensure the chemical reaction time more reliably, effective is a structure as shown in FIG. 5 as a third embodiment. In this structure, in addition to the special inner wall surfaces 26 in the specific region A1, the first channel enclosed by the first groove 21 and the cover plate 18 has another special inner wall surface 28 in another specific region A2 downstream of the region A1, the special inner wall surface 28 having an affinity with the second liquid L2 higher than that of the other inner wall surfaces in the other region.

The affinity of the inner wall surfaces 26 and 28 in the regions A1 and A2 not only promotes the second liquid L2 to close the first channel in the specific region A1, but also increases the surface area of the second liquid L2 (microspheres) in the region A2 downstream of the region A1 and consequently the contact area between the both liquids L1 and L2. Specifically, the microspheres made of the second liquid L2 adhere to the inner wall surfaces 28 to be deformed into irregular shapes different from spherical shapes, thus increasing the contact area between the microspheres and the first liquid L1. This increase in the contact area enhances the efficiency of the chemical reaction.

Figure 6:
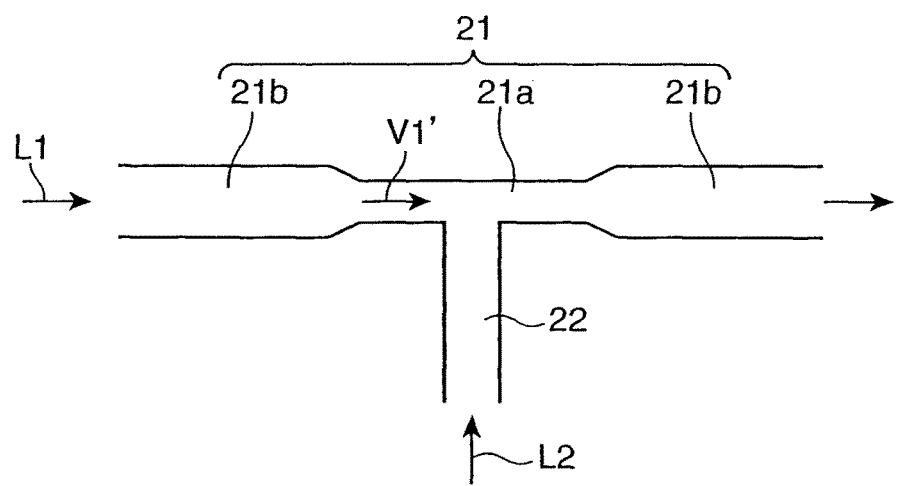
FIG. 6 is an enlarged plan view showing an essential part of a channel forming body according to a fourth embodiment of the invention.

FIG. 6 shows a shape of a first channel according to a fourth embodiment. In this embodiment, a first groove 21, which constitutes the above first channel, includes a groove 21a in the specific region including a junction point of the second channel and the first channel and grooves 21b out of the specific region, and the respective channel parts constituted by the grooves 21b have a larger channel cross-sectional area than that of the channel part constituted by the groove 21a.

This structure realizes both manufacture of microspheres of a desired size and reduction in pressure loss. Specifically, the regulated width of the groove 21a in the specific region allows the channel cross-sectional area in the specific region to correspond to the desired size of the microspheres, while the enlarged width of the grooves 21b can reduce the pressure loss out of the specific region. Particularly, in the structure shown in FIG. 6, the grooves 21b have shifting parts adjacent to the groove 21a and each of the shifting parts has a width gradually enlarged to a maximum width from the same width as the groove 21a, thus reducing the pressure loss more effectively than a groove where each of the shifting parts has a sharply varied width.

The channel cross-sectional area can be varied not only by a variation of the groove width as shown. For example, groove may have a varied depth while having a constant width. It goes without saying that a channel having a circular channel cross section may have a varied inner diameter.

In this embodiment, a flow velocity $V1'$ of the first liquid L1 in the groove 21a is higher than its supply velocity $V1$, which should be considered for setting the supply velocity $V1$.

Figure 7:
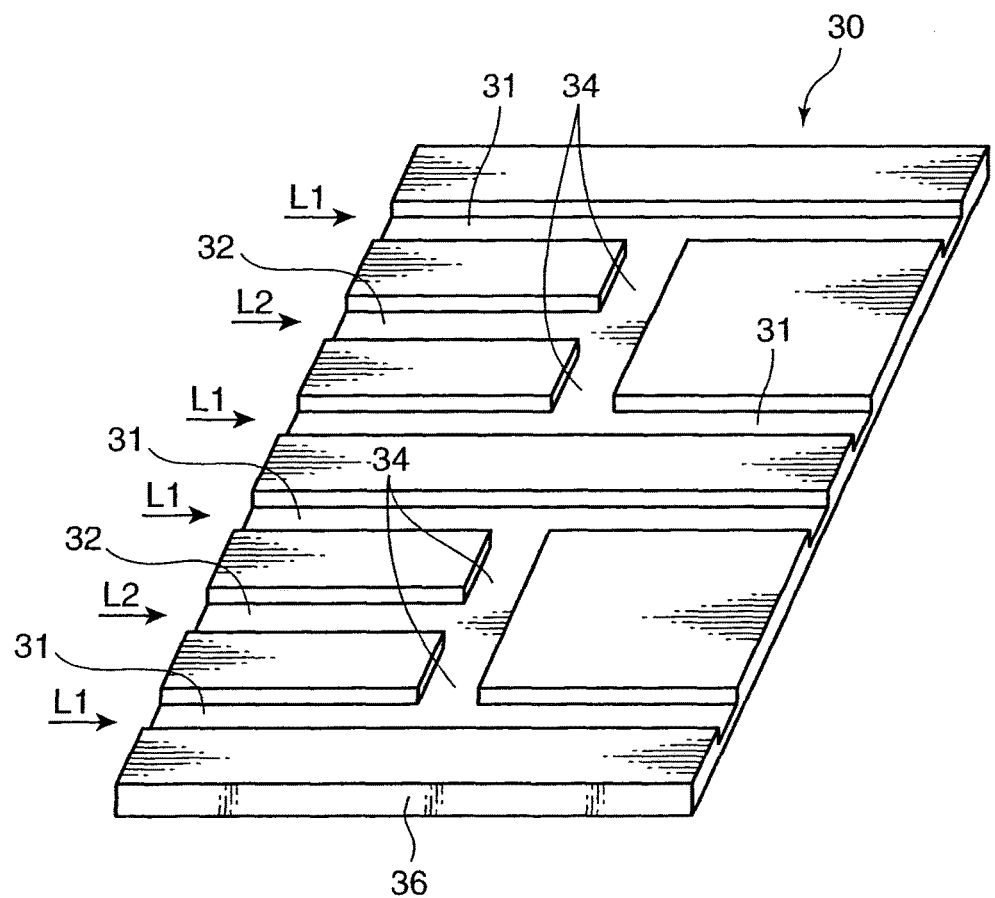
FIG. 7 is a perspective view showing a base plate of a channel forming body according to a fifth embodiment of the invention.

FIG. 7 shows a channel forming body 30 according to a fifth embodiment. This channel forming body 30 consists of an illustrated base plate 36 and an unillustrated cover plate to be bonded to the base plate 36. The base plate 30 has a rectangular shape, and its upper surface is formed with a plurality of (four in a shown example) first grooves 31 and a plurality of second grooves joined to the first grooves 31. Each of the second grooves consists of common groove 32 and branched grooves 34. The cover plate is bonded to the upper surface of the base plate 36 as to cover the grooves 31, 32 and 34.

The first grooves 31 are straight-shaped in parallel with each other, horizontally crossing the base plate 36. Each two of the first grooves 31 form one pair, and the second grooves 31 are formed between the paired first grooves 31. About the second grooves, each common groove 32 extends in parallel with the first grooves 31 and has one end reaching one longer side of the base plate 36 and the other end terminated near the center of the base plate 36. The branched grooves 34 are branched off from the terminal end of each of the common groove 32 perpendicularly to the common groove 32 to reach the first grooves 31 at the opposite sides.

In this channel forming body 30, a first liquid L1 is supplied into the first grooves 31 and a second liquid L2 is supplied into the common grooves 32, from one longer side of the base plate 36. The second liquid L2 supplied into each second groove 32 is diverted from the terminal end of the second groove 32 into the both branched grooves 34 to be supplied into intermediate parts of the first grooves 31 at the opposite sides, thereby forming microspheres in a manner similar to the one described above. In this way, microspheres made of the second liquid L2 are simultaneously and efficiently produced in a plurality of the first grooves 31 formed in a common base plate 36.

Furthermore, according to the present invention, a plurality of base plates including the base plate 16 shown in FIG. 2 or the base plate 36 shown in FIG. 7 and a plurality of cover plates for covering the grooves of the base plates may be alternately laminated in a thickness direction, which enables a greater number of microspheres to be mass produced.

Figure 8:
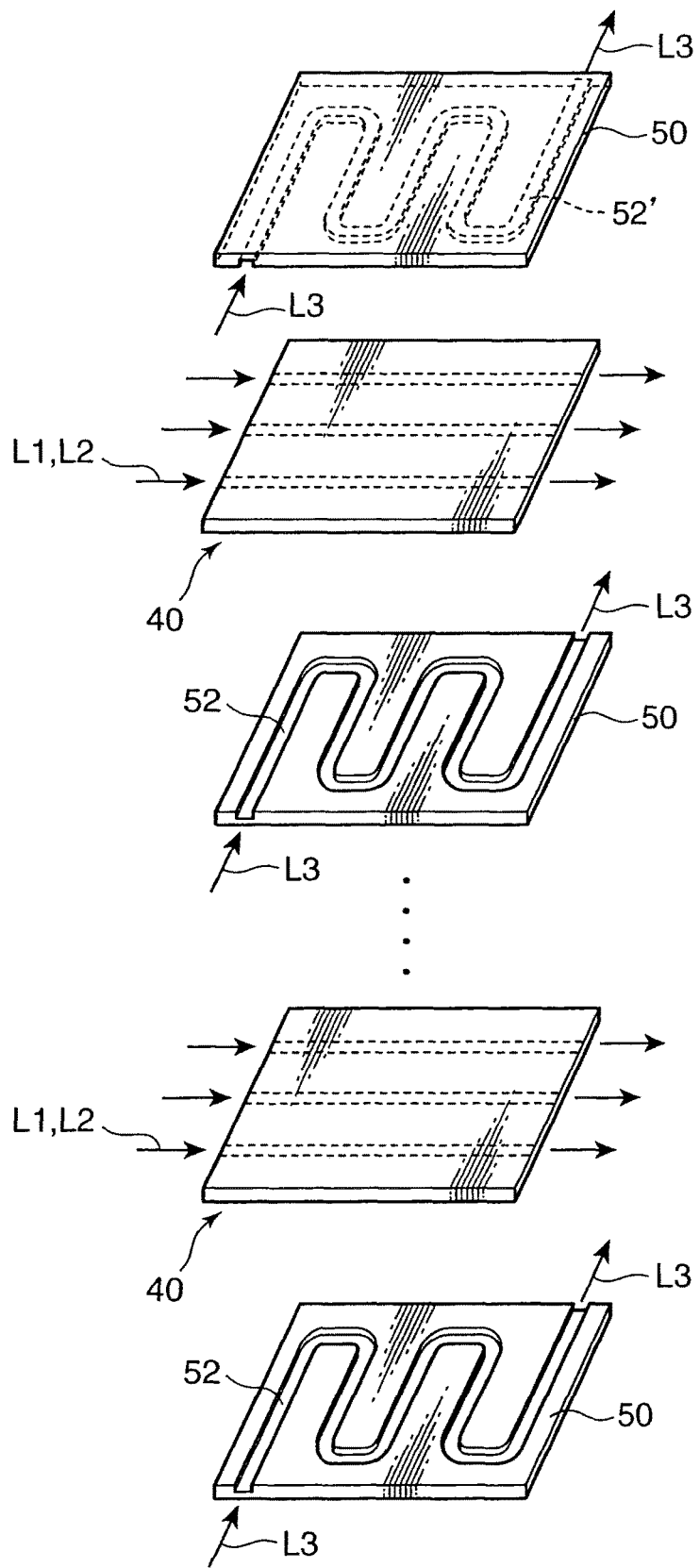
FIG. 8 is an exploded perspective view showing a channel forming body according to a sixth embodiment of the invention.
Figure 9:
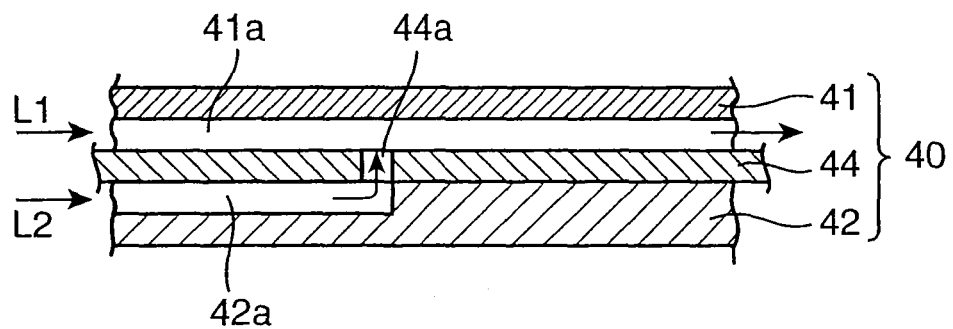
FIG. 9 is a section of a main body of the channel forming body shown in FIG. 8.

FIGS. 8 and 9 show a channel forming body according to a sixth embodiment. This channel forming body, which has a function of promoting chemical reaction between a first liquid L1 and a second liquid L2 in a compact structure, comprises a plurality of channel forming main bodies 40 and a plurality of temperature adjusting plates 50. The channel forming main bodies 40 and temperature adjusting plates 50 are alternately laminated in a thickness direction to build the channel forming body.

Each channel forming main body 40 is a unit as shown in FIG. 9, made up of a first base plate forming member 41, a second base plate forming member 42 and a cover plate 44 sandwiched therebetween.

The first base plate forming member 41 has a plurality of first grooves 41a and the second base plate forming member 42 has a plurality of second grooves 42a. The first grooves 41a are formed in the lower surface of the first base plate forming member 41, straight extending in parallel with each other. The second grooves 42a are formed in the upper surface of the second base plate forming member 42, straight extending and overlapping the corresponding first grooves 41a in a thickness direction of the channel forming main body 40, respectively. Each of the second grooves 42a is terminated at a position corresponding to an intermediate parts of the corresponding first groove 41 to form a terminal end.

The cover plate 44 is commonly used as a cover plate for both base plate forming members 41 and 42. Specifically, the cover plate 44 has an upper surface constituting a first joint surface to be bonded to the lower surface of the first base plate forming member 41 so as to cover the first grooves 41a from below, and a lower surface constituting a second joint surface to be bonded to the upper surface of the second base plate forming member 42 so as to cover the second grooves 42a from above. Furthermore, the cover plate 44 is formed with communication holes 44a penetrating the cover plate 44 so as to communicate the intermediate parts of the first grooves 41a and the terminal ends of the second grooves 42a in a thickness direction of the cover plate 44, respectively.

In this channel forming main body 40, the first liquid L1 is supplied into the first channels formed by the first grooves 41a and the cover plate 44, while the second liquid L2 is supplied into the second channels formed by the second grooves 42a and the cover plate 44. The second liquid L2 enters the intermediate parts of the first channels through the communication holes 44a of the cover plate 44. Thereafter, the second liquid L2 closes the first channels and is cut off by a pressure difference between upstream and downstream sides to form microspheres of a size corresponding to the cross-sectional area of the first channels in the same manner as in the first embodiment. Then, the second liquid L2 forming each of the microspheres is chemically reacted with the first liquid L1 while flowing in the first channels.

The channel forming main body 40 allows an area necessary for forming the channels to be reduced. As compared with the structure shown in FIG. 1 for example, in which the first groove 21 forming the first channel and the second groove 22 forming the second channel are arranged in one plane in a common base plate 16, the area required to arrange all the grooves in the channel forming main body 40 shown in FIG. 8 is drastically reduced. Particularly, overlap of the first grooves 41a and the second grooves 42a as shown makes the area necessary to form both the first channels and the second channels substantially equal to the area necessary only for the first channels. Besides, commonly using the cover plate 44 for covering both of the base plate forming members 41 and 42 reduces the thickness of the entire channel forming body.

The channel forming main body 40 can be singly used as a channel forming body; a plurality of the channel forming main bodies 40 can be mutually laminated in the thickness direction to increase an overall processing quantity. The application thereof is not limited to chemical reaction: it may be used only for manufacturing microspheres.

The temperature adjusting plates 50, for temperature adjustment suited to promoting the chemical reaction, are arranged at the top and the bottom of the entire channel forming body and between each two of the channel forming main bodies 40. Each of the temperature adjusting plates 50 has a groove 52 to form a temperature adjusting channel in which a temperature adjusting liquid L3 as a heat medium for the temperature adjustment is flowed.

Specifically, the uppermost temperature adjusting plate 50 is formed with the groove 52 in the lower surface thereof, and the other temperature adjusting plates 50 are formed with the grooves 52 in the upper surfaces thereof. These grooves 52 meander in such a manner as to cross the both grooves 41a and 42a of the channel forming main bodies 40 at a plurality of positions, the opposite ends thereof reaching opposite sides of the temperature adjusting plates 50, respectively. The grooves 52 and the upper or lower surface of the channel forming main bodies 40 form temperature adjusting channels, into which the temperature adjusting liquid L3 heated (or cooled) to suitable temperature is flowed.

The present invention is not limited to the embodiments described above and various changes can be made without departing from the gist of the present invention. For example, the shape of the base plate forming the channel forming body is not limited to the rectangular shape but may be set to various shapes such as circular shapes and polygonal shapes. The cross-sectional shapes of the respective channels can also be arbitrarily set. Each of the channels is not limited to one consisting of the grooves and the cover plate, but may be, for example, formed of a hole perforated in the channel forming body.

EXAMPLE 1

By use of the apparatus shown in FIGS. 1 and 2, manufactured are microspheres made of water. In the channel forming body 10 of the apparatus, the angle intersection of the first and second channels is 90°, and each of the grooves 21 and 22 has a width and a depth which are both 500 μm, formed by etching.

Used as the first liquid L1 is hexane; used as the second liquid L2 is water. The supply velocity of hexane is set to a low velocity of 0.040 m/s, while that of the water is set to 0.0044 m/s. The set velocities enable the water supplied to the intermediate part of the first channel to close the first channel in spite of the flow of the hexane in the first channel. Thereafter, the water is cut off due to a pressure difference to form microspheres of a stable size and be discharged together with the hexane.

EXAMPLE 2

By use of the apparatus shown in FIGS. 8 and 9, the chemical reaction between the first liquid L1 and the second liquid L2 is carried out. The dimensions of the grooves 41a and 42a of the channel forming main bodies 40 in this apparatus and processing methods thereof are similar to those of Example 1. This also holds for the grooves 52 of the temperature adjusting plates 50.

Used as the first liquid L1 is benzene, and used as the second liquid L2 is mixed acid (nitric acid: 60%, sulfuric acid: 20%, water: 20%). Similar to Example 1, the supply velocity of the benzene is set to 0.040 m/s, while that of the mixed acid is set to 0.0044 m/s. used as the temperature adjusting liquid L3 is water, supplied to the temperature adjusting channels formed by the grooves 52 while heated to 50° C.

In this method, the mixed acid can close the first channel in spite of the flow of the benzene in the first channel and, thereafter, can be cut off due to a pressure difference to form microspheres.

As described above, the present invention provides a method for manufacturing microspheres made of a second liquid in a first liquid. This method comprises a step of supplying the first liquid into a first channel to flow it in the first channel; and a second step of supplying the second liquid to an intermediate part of the first channel through a second channel connected with this first channel. The supply velocities of the first and second liquids into the first channel are set such that the second liquid supplied into the first channel closes the first channel and a part of the second liquid having closed the first channel is cut off from the other part of the second liquid in the second channel by a pressure difference in the first channel between an upstream side and a downstream side, and moves to the downstream side in the first channel to form microspheres.

In this method, the second liquid supplied to the intermediate part of the first channel closes the first channel, and thereafter the part of the first liquid having closed the first channel is cut off from the other part of the second liquid in the second channel due to the pressure difference in the first channel between the upstream and downstream of the intermediate part after closing the first channel. This makes the sizes of the microspheres formed by this cutting-off action correspond to the cross-sectional area of the first channel. Accordingly, the obtained sizes of microspheres are stable and easily predicted as compared with the conventional methods by which the second liquid supplied into the first channel is suddenly sheared by the power of the flow of the first liquid before closing the first channel. In other words, microspheres of a desired size can be stably obtained and facility cost can be reduced.

In this method, limitation of the supply velocity of the first liquid into the first channel enables the second liquid to completely close the first channel. This contributes not only to the stable sizes of the microspheres, but also to a miniaturized facility for supplying the first liquid and reduced power necessary for the facility.

This microsphere manufacturing method can be utilized for chemical reaction between the first liquid and the second liquid. Specifically, the chemical reaction between the first liquid and the second liquid can be performed while the microspheres made of the second liquid are flowed in the first channel downstream of the point at which the second liquid is supplied. The reaction velocity of this chemical reaction is stabilized by use of the microsphere manufacturing method according to the present invention. Since the chemical reaction occurs in a contact area between the first liquid and the second liquid, the reaction velocity largely depends on the contact area between the both liquids. Therefore, the stabilization of the sizes of the microspheres formed of the second liquid results in the stable contact areas, and further the stable reaction velocity.

The present invention provides also a channel forming body suitable for the microsphere manufacturing method. This channel forming body forms channels including a first channel into which the first liquid is supplied and a second channel joined to the first channel at an intermediate part thereof, and has a special inner wall surface in a specific region of the first channel including a junction point of the first and second channels, the special inner wall surface having an affinity with the second liquid higher than that of the other inner wall surfaces out of the specific region.

This channel forming body permits an action that the second liquid closes the first channel to be more easily realized. Specifically, the high affinity of the special inner wall surface of the first channel in the specific region including the supply point of the second liquid with the second liquid allows the second liquid to be likely to stay at the supply point, thus enabling the second liquid to close the first channel more reliably. Moreover, the microspheres formed by cut-off of the second liquid can smoothly flow in the first channel out of the specific region to be discharged.

On the other hand, a channel forming body suitable for the above chemical reaction method is as follows: the channel forming body forms channels including a first channel into which the first liquid is supplied and a second channel joined to the first channel at an intermediate part thereof, and has a special inner wall surface in a specific region of the first channel including a junction point of the first and second channels and a reaction region downstream of the specific region for chemical reaction between the first liquid and the second liquid, the special inner wall surface having an affinity with the second liquid of inner wall surfaces higher than that of the other inner wall surfaces out of the specific region and the reaction region.

This channel forming body permits a contact area between the first and second liquids necessary for the chemical reaction of the first and second liquids to be increased. If the affinity with the second liquid of the inner wall surfaces of the first channel in the downstream region is low, the second liquid generally moves in the channel in a sphere-shape because of its surface tension. On contrast, if the affinity is high, the second liquid can adhere to the inner wall surfaces of the channel, thereby slowly moving while being formed into irregular shapes other than spheres. This increases the contact area between the first and second liquids per unit volume, thus enhancing the chemical reaction efficiency of the both liquids.

The present invention also provides an apparatus for manufacturing microspheres made of a second liquid in a first liquid. This apparatus comprises a channel forming body forming channels including a first channel into which the first liquid is supplied and a second channel joining an intermediate part of the first channel; first liquid supply means for supplying the first liquid into the first channel to flowing it along the first channel; and second liquid supply means for supplying the second liquid into the second channel to supply it to the intermediate part of the first channel through the second channel. The supply velocity of the first liquid by the first liquid supply means and that of the second liquid by the second liquid supply means are set such that the second liquid supplied into the first channel closes the first channel and a part of the second liquid having closed the first channel is cut off from the other part of the second liquid in the second channel by a pressure difference in the first channel between its upstream and downstream sides to form microspheres.

The above-mentioned channel forming body is suitable as the channel forming body of the apparatus; however, various other structures may be applied.

For example, the channel forming body may have a larger channel cross-sectional area out of a specific region of the first channel including a point at which the second channel is joined to the first channel than a channel cross-sectional area in the specific region. In this channel forming body, the channel cross-sectional area of the first channel in the specific region can be set to an area corresponding to a desired size of microspheres, while the larger channel cross-sectional area out of the specific region can reduce a pressure loss.

Besides, the channel forming body may include a base plate formed with grooves shaped in conformity with the first channel and the second channel, and a cover member to be bonded to the base plate so as to cover the grooves of the base plate: in this channel forming body, in which a combination of the base plate and the cover member allow the both channels to be easily formed.

Furthermore, the channel forming body may include a plurality of base plates and a plurality of cover plates corresponding to the above cover member, the base plates and the cover plates alternately laminated in a thickness direction thereof: this channel forming body can enhance manufacture efficiency of the microspheres in a compact structure.

In the channel forming body, the base plate may be divided into a first base plate forming member formed with a groove corresponding to the first channel and a second base plate forming member formed with a groove corresponding to the second channel, while the cover member includes a first joint surface to be bonded to the first base plate forming member so as to cover the groove and a second joint surface which is a surface opposite to the first joint surface and to be bonded to the second base plate forming member so as to cover the groove and a communication hole formed to communicate the groove of the first base plate forming member and the groove of the second base plate forming member. This channel forming member allows an area necessary to form the channels to be reduced. Specifically, the area necessary for arranging the grooves is drastically reduced as compared with a channel forming body in which a groove corresponding to the first channel and a groove corresponding to the second channel are arranged in one plane in a common base plate forming member. In addition, the cover member, which is used as lids of both of the first and second base plate forming member, can contribute to a small thickness of the entire channel forming body.

The first channel and the second channel may overlap in a thickness direction of the base plate. This allows an area necessary for forming the channels to be substantially equal to an area necessary for the first channel.

Besides, the channel forming body may comprise a plurality of units each including the first and second base plate forming members and the cover member sandwiched between the first and second base plate forming members, the units laminated in a thickness direction: this channel forming body can possess high throughputs.

The microsphere manufacturing apparatus can perform the chemical reaction of microspheres made of the second liquid with the first liquid, when the part of the first channel downstream of a junction point with the second channel has a channel length enough to allow the chemical reaction.

In this case, the channel forming body preferably has a special inner wall surface in a specific region of the first channel including a junction point of the first and second channels and a reaction region downstream of the specific region for chemical reaction between the first liquid and the second liquid, the special inner wall surface having an affinity with the second liquid of inner wall surfaces higher than that of the other inner wall surfaces out of the specific region and the reaction region.

More preferably, each of the above channel forming bodies forms, in addition to the first and second channels, a temperature adjusting channel in which a temperature adjusting liquid for adjustment of the temperature of at least one of the first and second liquids is flowed. The presence of this temperature adjusting channel enables a temperature of the manufactured microspheres to be adjusted. Particularly, on chemical reaction between the microspheres (i.e. second liquid) and the first liquid, the temperature adjusting channel can help a temperature management suitable for the chemical reaction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A method for manufacturing microspheres made of a second liquid in a first liquid, comprising:
    a step of providing a channel forming body, which channel forming body provides channels including a first channel and a second channel joined to an intermediate part of the first channel at a junction point, the first channel having a special inner wall surface throughout a specific region of the first channel and another inner wall surface in another region of the first channel which is upstream or downstream of said specific region in a direction of flow of the first liquid in the first channel, the specific region including the junction point, wherein the special inner wall surface is formed with a convexo-concave pattern providing an affinity with the second liquid higher than that of the another inner wall surface in the another region of the first channel;
    a step of supplying the first liquid into the first channel to flow the first liquid in the first channel at a first supply velocity;
    a step of supplying the second liquid to the intermediate part of the first channel at the junction point through the second channel joined to the first channel at a second supply velocity with a ratio of the first supply velocity to the second supply velocity, the ratio being sufficiently low that the second liquid supplied to the first channel at the junction point remains at the junction point until the second liquid forms a closing part which completely closes the first channel; and
    a step of promoting the second liquid to stay at the junction point in the specific region by the affinity of the special inner surface in the specific region with the second liquid, to thereby generate a pressure difference between a pressure at an upstream side of the closing part of the second liquid and a pressure at a downstream side of the closing part of the second liquid in the first channel, the pressure difference cutting off the closing part from the other part of the second liquid in the second channel to thereby move the closing part to the downstream side of the first channel to form microspheres of the second liquid.

2. A method for chemically reacting a first liquid and a second liquid, comprising:
    a step of providing a channel forming body, which channel forming body forms channels including a first channel and a second channel joined to an intermediate part of the first channel at a junction point, the first channel having a special inner wall surface throughout a specific region of the first channel and another inner wall surface in another region of the first channel which is upstream or downstream of said specific region in a direction of flow of the first liquid in the first channel, the specific region including the junction point, the special inner wall surface being formed with a convexo-concave pattern providing an affinity with the second liquid higher than that of the another inner wall surface in the another region of the first channel;

a step of supplying the first liquid into the first channel to flow it in the first channel at a first supply velocity;

a step of supplying the second liquid to the intermediate part of the first channel at the junction point through the second channel joined to the first channel at a second supply velocity with a ratio of the first supply velocity to the second supply velocity, the ratio being so low as to allow the second liquid supplied to the first channel at the junction point to remain at the junction point until the second liquid forms a closing part which completely closes the first channel;

a step of promoting the second liquid to stay at the junction point in the specific region by the affinity of the special inner surface in the specific region with the second liquid to thereby generate a pressure difference between a pressure at an upstream side of the closing part of the second liquid and a pressure at a downstream side of the closing part of the second liquid in the first channel, the pressure difference cutting off the closing part from the other part of the second liquid in the second channel to thereby move the closing part to the downstream side of the first channel to form microspheres of the second liquid; and a step of causing a chemical reaction between the first and second liquids while the microspheres made of the second liquid flow in the first channel downstream of the junction point.

3. The method according to claim 2, wherein the first channel further comprises a reaction region located downstream of the specific region, in the flow direction of the first liquid, for a chemical reaction of the first liquid and the second liquid, wherein the special inner wall surface is also provided to the reaction region.

* * * * *